UNITED STATES PATENT OFFICE.

MANUEL PEREDA, OF BROOKLYN, NEW YORK.

BEVERAGE AND PROCESS OF MAKING SAME.

SPECIFICATION forming part of Letters Patent No. 697,656, dated April 15, 1902.

Application filed June 14, 1901. Serial No. 64,519. (No specimens.)

*To all whom it may concern:*

Be it known that I, MANUEL PEREDA, a citizen of the United States, residing in the borough of Brooklyn, in the city of New York, county of New York, and State of New York, have invented a new and useful Beverage and Process of Making the Same, of which the following is a specification.

This composition of matter is a pineapple-wine, which I have called "Cuban pineapple-nectar."

My composition consists of the following ingredients combined in the proportions stated, viz: pineapple-juice, one hundred pounds; brewer's yeast, one-half pound; white sugar, one-half pound; pineapple-brandy, six pounds.

In carrying out my invention I first mash into pulp a sufficient quantity of ripe pineapples. From this pulp I press out the juice into a proper vessel. This juice is divided into two parts, each in a separate vessel. The pineapple-juice without any additional ingredient in one vessel is allowed to take on alcoholic fermentation. It is then distilled in the common and well-known way to produce pineapple-brandy, which is preserved for further use. The other part of the pineapple-juice is filtered into a proper vessel for fermenting, and there is added to it one-half a pound of brewer's yeast and one-half a pound of white sugar for each one hundred pounds of the pineapple-juice. These are allowed to ferment together until alcohol is developed. This requires from eight to ten days' time. The liquor is then again strained, and to each one hundred pounds there are added six pounds of the above-described pineapple-brandy. The liquor thus prepared is then filled into bottles and corked under pressure. After it has been kept in the bottles for six months it will be ready for use and will be found an exceedingly agreeable sparkling beverage.

If it be desired, the proportion of the brandy may be altered as may be required or to suit the taste of the compounder.

What I claim, and desire to secure by Letters Patent of the United States, is—

1. The process whereby the said beverage is prepared, to wit, by crushing pineapples into a mash, filtering the juice therefrom, fermenting a part of this juice alone, obtaining brandy from such fermented juice by distillation, by adding to one hundred pounds of the other portion of such pineapple-juice one-half of a pound of brewer's yeast, and one-half of a pound of white sugar, fermenting this compound, until alcohol is developed, again straining this fermented liquor, adding to each one hundred pounds of such fermented liquor, six pounds of the said pineapple-brandy, and bottling the compound so prepared, under pressure, substantially as described, and for the purpose specified.

2. The herein-described composition of matter consisting of pineapple-juice, one hundred pounds, brewer's yeast one-half of a pound, and white sugar one-half of a pound mixed and fermented, and six pounds of pineapple-brandy, added to said fermented liquor, all substantially in the proportions, and prepared by the process hereinbefore set forth, thereby producing a beverage which is pleasantly flavored with the taste and odor of pineapples, and is an exceedingly agreeable, sparkling, refreshing drink, all substantially as described, and for the purpose set forth.

In testimony that I claim the foregoing as my invention I have signed my name, in presence of two witnesses, this 8th day of June, 1901.

MANUEL PEREDA.

Witnesses:
T. CABALLERO COE,
S. FERO.